United States Patent
Bogumil et al.

(10) Patent No.: US 8,883,365 B2
(45) Date of Patent: Nov. 11, 2014

(54) FUEL CELL STACK DISCRETE HEADER

(75) Inventors: Todd D. Bogumil, Rochester, NY (US); Glenn W. Skala, Churchville, NY (US); Matthew J. Beutel, Webster, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 552 days.

(21) Appl. No.: 12/709,693

(22) Filed: Feb. 22, 2010

(65) Prior Publication Data

US 2011/0207024 A1    Aug. 25, 2011

(51) Int. Cl.
| | |
|---|---|
| H01M 2/38 | (2006.01) |
| H01M 2/40 | (2006.01) |
| H01M 8/24 | (2006.01) |
| H01M 2/20 | (2006.01) |
| H01M 2/08 | (2006.01) |
| H01M 2/14 | (2006.01) |
| H01M 8/04 | (2006.01) |
| H01M 8/02 | (2006.01) |

(52) U.S. Cl.
CPC .............. *H01M 8/0247* (2013.01); *Y02E 60/50* (2013.01); *H01M 8/0267* (2013.01); *H01M 8/0273* (2013.01)

USPC ........... 429/460; 429/456; 429/457; 429/458; 429/459; 429/470; 429/508; 429/514

(58) Field of Classification Search
USPC .......................... 429/456–460, 470, 508, 514
See application file for complete search history.

(56) References Cited

U.S. PATENT DOCUMENTS

| | | | | |
|---|---|---|---|---|
| 4,738,905 | A * | 4/1988 | Collins | 429/460 |
| 5,514,487 | A * | 5/1996 | Washington et al. | 429/460 |
| 6,596,427 | B1 * | 7/2003 | Wozniczka et al. | 429/435 |
| 2004/0023095 | A1 * | 2/2004 | Middelman et al. | 429/34 |
| 2005/0271909 | A1 * | 12/2005 | Bai et al. | 429/13 |
| 2008/0213649 | A1 * | 9/2008 | Okabe | 429/35 |

* cited by examiner

*Primary Examiner* — Eugenia Wang
(74) *Attorney, Agent, or Firm* — Fraser Clemens Martin & Miller LLC; J. Douglas Miller

(57) ABSTRACT

A fuel cell system comprises a main body including a first partial header and a fastening point. The main body is adapted to be coupled to a plurality of plates forming a fuel cell stack, allowing a single plate design to be used for multiple fuel cell stack lengths having a large differential of energy requirements, affording a durable alignment mechanism for the fuel cell stack, and providing integration flexibility for components and configurations of the fuel cell system.

6 Claims, 5 Drawing Sheets

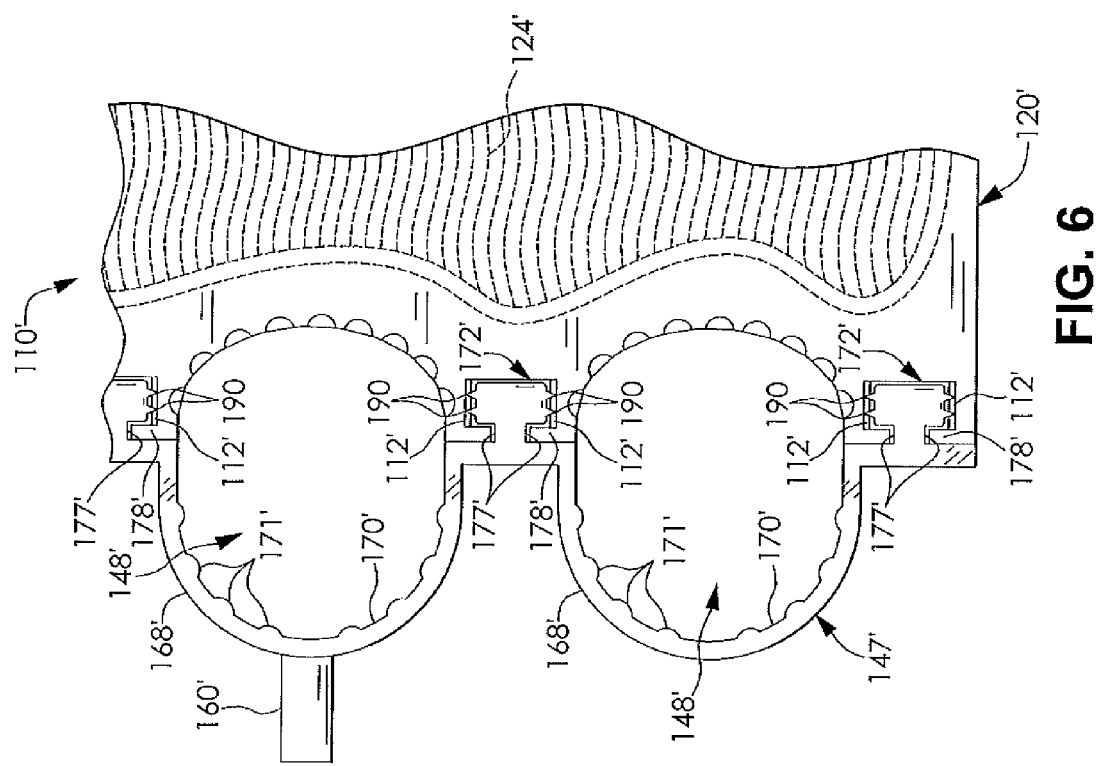
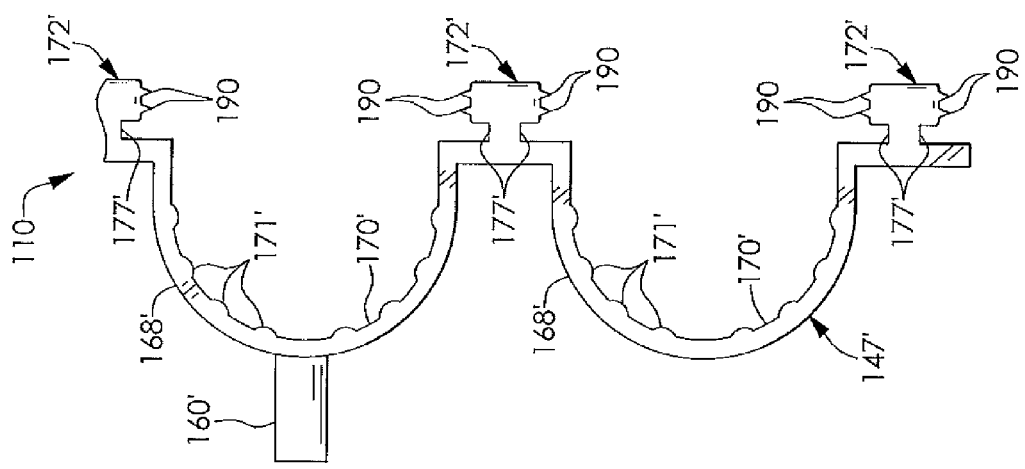

FUEL CELL STACK DISCRETE HEADER

FIELD OF THE INVENTION

The present disclosure relates to a fuel cell assembly and more particularly to header manifolds for reactants and coolant supplied to and removed from a fuel cell stack.

BACKGROUND OF THE INVENTION

Fuel cell systems are increasingly being used as a power source in a wide variety of applications. Fuel cell systems have been proposed for use in power consumers such as vehicles as a replacement for internal combustion engines, for example. Such a system is disclosed in commonly owned U.S. patent application Ser. No. 10/418,536, hereby incorporated herein by reference in its entirety. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell is efficient, substantially pollution-free, quiet, free from moving parts (other than an air compressor, cooling fans, pumps and actuators), and may be constructed to leave only heat and water as by-products. The term "fuel cell" is typically used to refer to either an individual cell or a plurality of cells depending upon the context in which it is used. The plurality of cells is typically bundled together and arranged to form a stack with the plurality of cells commonly arranged in electrical series. Since individual fuel cells can be assembled into stacks of varying lengths, systems can be designed to produce a desired energy output level providing flexibility of design for different applications.

The stacks may comprise of more than one hundred individual bipolar plates, wherein successive plates and a membrane-electrode-assembly (MEA) disposed therebetween form the individual cell. Typically, apertures formed in successive bipolar plates cooperate to form a "header" running the length of the fuel cell stack. The plate formed header distributes reactants (such as oxygen and hydrogen) and coolant to the individual cells. A first end of the plate formed header is sealingly disposed against an end unit, wherein an injector, a recycler, a reactant source, a humidifier, or other support system is typically disposed. A second end of the plate formed header is sealingly disposed against an end plate or a second end unit.

Bipolar plates include active and inactive areas formed thereon. The electrochemical reaction occurs in active areas of the bipolar plates. Inactive areas are used to guide reactants and coolants across portions of the plate, provide sealing surfaces for gasket material, form apertures in the plate, and provide structural support for the plate. Large areas of inactive areas on plates result in an inefficient use of the plate and a gasket used to form the individual cells.

Fuel cell stacks of varying number of cells require different amounts of reactants and coolant to operate properly. Apertures formed in the bipolar plates may be sized to optimize reactant and coolant flow rates to and from the fuel cell stack. A stack having a larger number of cells, and thus a longer stack length requires plate formed headers capable of carrying more reactants and coolant, necessitating larger apertures in the plates. As a result, a particular plate design is limited to a relatively narrow range of stack lengths, and a manufacturer may be required to support multiple plate designs to accommodate a number of vehicles having a large differential of energy requirements.

Fuel cell stacks require a close stacking alignment and adequate sealing between successive plates. Sealing surfaces formed on the plates and the MEAs must be properly aligned to form the fuel cell stack that operates efficiently, militates against leakage of reactants and coolant, and electrically isolates successive plates from one another.

Plate formed headers have a consistent cross-sectional shape along a header length when a single plate design is used to form the fuel cell stack. A consistent cross sectional shape may be undesirable for to the fuel cell stack because a pressure differential may exist along the length of the header, causing differences in reactant and coolant flow rates into individual cells. Additionally, plate formed headers limit header access to ends of the fuel cell stack for placement of components such as a distribution manifold, a water separator, and an infector, for example, necessary for operation of the fuel cell stack.

It would be desirable to produce a discrete header for a fuel cell stack, wherein the discrete header minimizes use of the plate and the gasket materials, allows a single plate design to be used for multiple stack lengths having a large differential of energy requirements, provides a durable alignment mechanism for the fuel cell stack, and provides integration flexibility for components and configurations of the fuel cell stack.

SUMMARY OF THE INVENTION

Presently provided by the invention, a discrete header for a fuel cell system that minimizes use of the plate and the gasket materials, allows a single plate design to be used for multiple fuel cell stack lengths having a large differential of energy requirements, provides a durable alignment mechanism for the fuel cell stack, and provides integration flexibility for components and configurations of the fuel cell system, has surprisingly been discovered.

In a first embodiment, the fuel cell system, comprises a fuel cell plate including a first partial header, and a main body including a second partial header and a fastening point, the fastening point coupled to the plate, the fastening point of the main body securing the main body to the plate to form a header between the first partial header and the second partial header.

In another embodiment, the fuel cell system comprises a plurality of fuel cell plates aligned to form a fuel cell stack, the stack including a first partial header and a channel, a plurality of membrane electrode assemblies at least partially formed from a gasket material, the membrane electrode assemblies disposed between the fuel cell plates, a discrete header section including a second partial header, and a fastening point disposed on the discrete header section, the fastening point extending along a length of the discrete header section, the fastening point being a flanged protuberance substantially conforming to a shape of the channel, wherein the fastening point is coupled to the channel to form a header from the first partial header and the second partial header.

In a further embodiment, a fuel cell system comprises a plurality of fuel cell plates aligned to form a fuel cell stack, the stack including a first partial header and a channel, a plurality of membrane electrode assemblies at least partially formed from a gasket material, the membrane electrode assemblies disposed between the fuel cell plates, a discrete header section including a second partial header and one of a fluid inlet and a fluid outlet formed in the second partial header at an intermediate position along a length of the discrete header section, a fastening point disposed on the discrete header section, the fastening point extending along the length of the discrete header section, the fastening point being a flanged protuberance substantially conforming to a shape of the channel, and a fastening keyway formed in the fastening point, the fastening keyway extending along a length of the discrete header for receiving a header key, wherein the fastening point expands when the header key is inserted into the fastening keyway, the fastening point abutting one of the channel and the plurality of membrane electrode assemblies disposed between the plurality of fuel cell plates, securing the discrete header section to the stack to form a header from the first partial header and the second partial header.

DRAWINGS

The above, as well as other advantages of the present invention, will become readily apparent to those skilled in the art from the following detailed description of embodiments of the invention when considered in the light of the accompanying drawings in which:

FIG. 5 is an enlarged, fragmentary top plan view of a discrete header according to another embodiment of the present disclosure;

FIG. 6 is an enlarged, fragmentary top plan view of the discrete header shown in FIG. 5, shown coupled to a fuel cell stack;

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
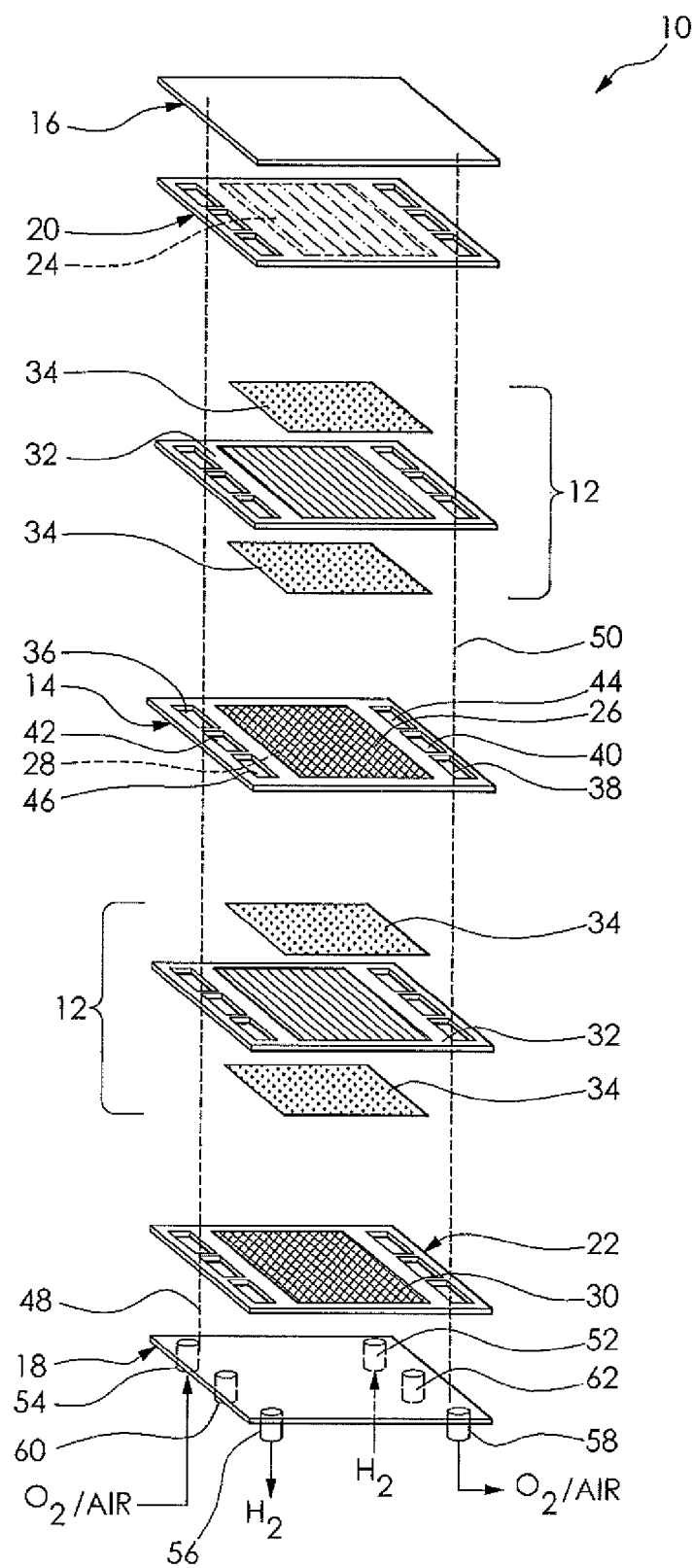
FIG. 1 is an exploded perspective view of an illustrative fuel cell stack known in the art.

FIG. 1 depicts a fuel cell stack 10 having a pair of membrane electrode assemblies 12 separated from each other by an electrically conductive bipolar plate 14. For simplicity, only a two-cell stack (i.e. one bipolar plate) is illustrated and described in FIG. 1, it being understood that the fuel cell stack 10 will typically have many more cells and bipolar plates.

The membrane electrode assemblies 12 and bipolar plate 14 are stacked together between a pair of clamping plates 16, 18 and a pair of unipolar end plates 20, 22. The clamping plates 16, 18 are electrically insulated from the end plates 20, 22 by a seal or a dielectric coating (not shown). The unipolar end plate 20, both working faces of the bipolar plate 14, and the unipolar end plate 22 include respective active areas 24, 26, 28, 30. The active areas 24, 26, 28, 30 are typically flow fields for distributing gaseous reactants such as hydrogen gas and air over an anode and a cathode, respectively, of the membrane electrode assemblies 12.

The bipolar plate 14 is typically formed by a conventional process for shaping sheet metal such as stamping, machining, molding, or photo etching through a photolithographic mask, for example. In one embodiment, the bipolar plate 14 is formed from unipolar plates which are then joined by any conventional process such as welding or adhesion. It should be further understood that the bipolar plate 14 may also be formed from a composite material. In one particular embodiment, the bipolar plate 14 is formed from a graphite or graphite-filled polymer.

A plurality of nonconductive gaskets 32, which may be a component of the membrane electrode assemblies 12, are disposed between the bipolar plate 14 and the unipolar end plates 20, 22. The gaskets 32 militate against fuel cell leakage and provide electrical insulation between the plates 14, 20, 22 of the fuel cell stack 10. Gas-permeable diffusion media 34 are disposed adjacent the membrane electrode assemblies 12. The end plates 20, 22 are also disposed adjacent the diffusion media 34, respectively, while the active areas 26, 28 of the bipolar plate 14 are disposed adjacent the diffusion media 34.

The bipolar plate 14, unipolar end plates 20, 22, and the membrane electrode assemblies 12 each include a cathode supply aperture 36 and a cathode exhaust aperture 38, a coolant supply aperture 40 and a coolant exhaust aperture 42, and an anode supply aperture 44 and an anode exhaust aperture 46. A conventional supply header 48 of the fuel cell stack 10 is formed by an alignment of the respective apertures 36, 42, 46 in the bipolar plate 14, unipolar end plates 20, 22, and the membrane electrode assemblies 12. A conventional exhaust header 50 of the fuel cell stack 10 is formed by an alignment of the respective apertures 38, 40, 44 in the bipolar plate 14, unipolar end plates 20, 22, and the membrane electrode assemblies 12. The hydrogen gas is supplied to an anode supply header via an anode inlet conduit 52. The air is supplied to a cathode supply header of the fuel cell stack 10 via a cathode inlet conduit 54. An anode outlet conduit 56 and a cathode outlet conduit 58 are also provided for an anode exhaust header and a cathode exhaust header, respectively. A coolant inlet conduit 60 is provided for supplying liquid coolant to a coolant supply header. A coolant outlet conduit 62 is provided for removing coolant from a coolant exhaust header. It should be understood that the configurations of the various inlets 52, 54, 60 and outlets 56, 58, 62 in FIG. 1 are for the purpose of illustration, and other configurations may be chosen as desired.

Figure 2:
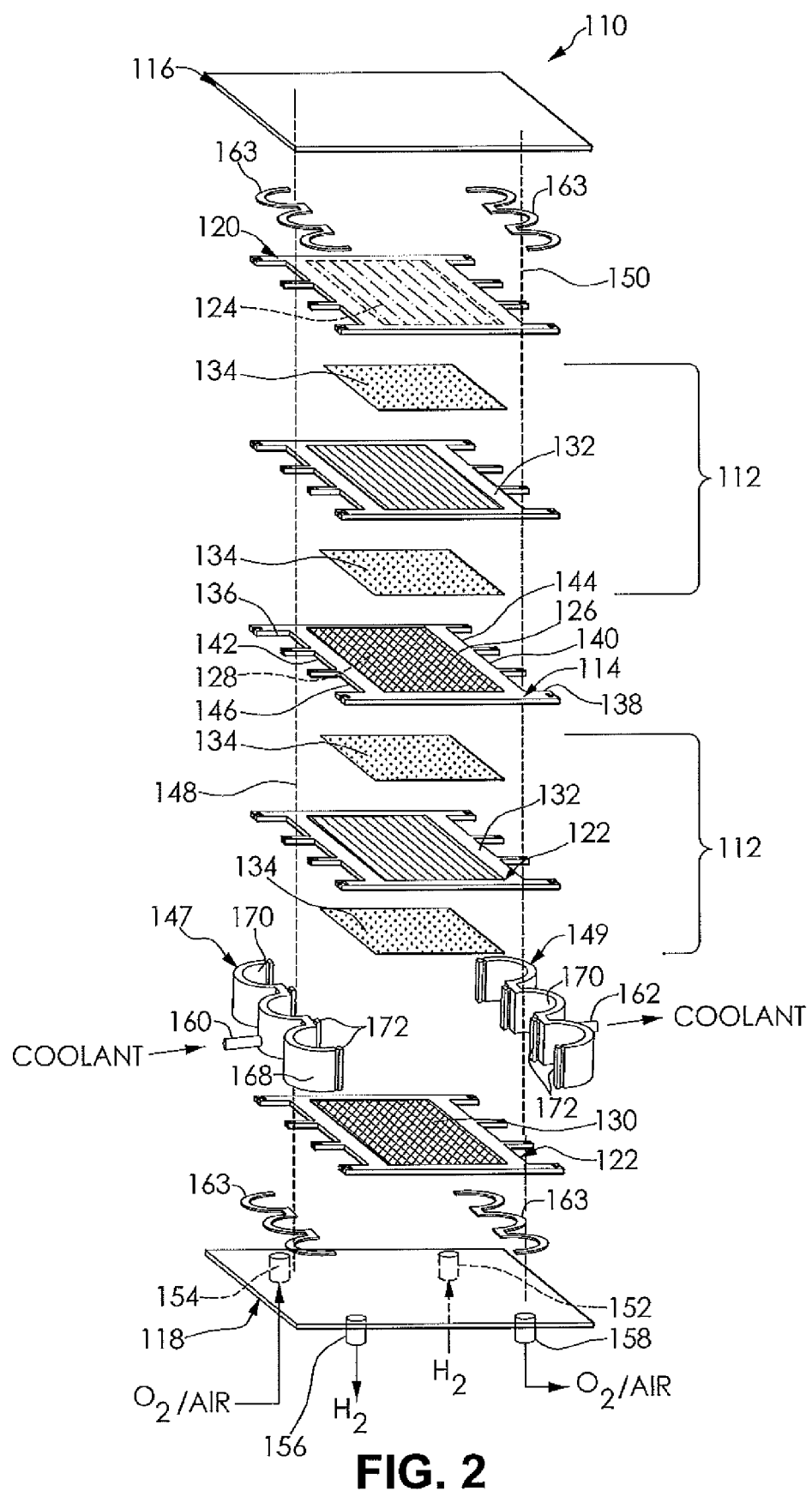
FIG. 2 is an exploded perspective view of an illustrative fuel cell stack according to the present invention.

FIG. 2 depicts a fuel cell stack 110 according to an embodiment of the present invention having a pair of membrane electrode assemblies 112 separated from each other by an electrically conductive bipolar plate 114. For simplicity, only a two-cell stack (i.e. one bipolar plate) is illustrated and described in FIG. 2, it being understood that the fuel cell stack 110 will typically have many more cells and bipolar plates.

The membrane electrode assemblies 112 and the bipolar plate 114 are stacked together between a pair of clamping plates 116, 118 and a pair of unipolar end plates 120, 122. The clamping plates 116, 118 are typically electrically insulated from the end plates 120, 122 by a seal or a dielectric coating (not shown). As illustrated, the clamping plates 116, 118 may be one of a cap plate and a header plate. The unipolar end plate 120, both working faces of the bipolar plate 114, and the unipolar end plate 122 include respective active areas 124, 126, 128, 130. The active areas 124, 126, 128, 130 are typically flow fields for distributing gaseous reactants such as hydrogen and air over an anode and a cathode, respectively, of the membrane electrode assemblies 112.

The bipolar plate 114 is typically formed by a conventional process for shaping sheet metal such as stamping, machining, molding, or photo etching through a photolithographic mask, for example. In one embodiment, the bipolar plate 114 is formed from unipolar plates which are then joined by any conventional process such as welding or adhesion. It should be further understood that the bipolar plate 114 may also be formed from a composite material or other materials. In one particular embodiment, the bipolar plate 114 is formed from a graphite or graphite-filled polymer.

A plurality of nonconductive gaskets 132, which may be a component of the membrane electrode assemblies 112, is disposed between the bipolar plate 114 and the unipolar end plates 120, 122. The gaskets 132 militate against fuel cell leakage and provide electrical insulation between the plates 114, 120, 122 of the fuel cell stack 10. Gas-permeable diffusion media 134 are disposed adjacent the membrane electrode assemblies 112. The end plates 120, 122 are also disposed adjacent the diffusion media 134, respectively, while the active areas 126, 128 of the bipolar plate 114 are disposed adjacent the diffusion media 134.

The bipolar plate 114, unipolar end plates 120, 122, and the membrane electrode assemblies 112 each include a cathode supply region 136 and a cathode exhaust region 138, a coolant supply region 140 and a coolant exhaust region 142, and an anode supply region 144 and an anode exhaust region 146. A first plurality of partial first headers of the fuel cell stack 110 is formed by an alignment of the respective regions 136, 142, 146 in the bipolar plate 114, unipolar end plates 120, 122, and the membrane electrode assemblies 112. A first discrete header section 147 having a second plurality of partial first headers is sealingly engaged with the bipolar plate 114, the unipolar end plates 120, 122, and the membrane electrode assemblies 112 to form a plurality of first headers 148. A first plurality of partial headers of the fuel cell stack 110 is formed by an alignment of the respective region 138, 140, 144 in the bipolar plate 114, unipolar end plates 120, 122, and the membrane electrode assemblies 112. A second discrete header section 149 having a second plurality of partial first headers is sealingly engaged with the bipolar plate 114, unipolar end plates 120, 122, and the membrane electrode assemblies 112 to form a plurality of second headers 150. The hydrogen gas is supplied to an anode supply header via an anode inlet conduit 152. The air is supplied to a cathode supply header of the fuel cell stack 110 via a cathode inlet conduit 154. An anode outlet conduit 156 and a cathode outlet conduit 158 are also provided for an anode exhaust header and a cathode exhaust header, respectively. A coolant inlet conduit 160 is in fluid communication with the discrete header section 147 for supplying liquid coolant to a coolant supply header. A coolant outlet conduit 162 is in fluid communication with the discrete header section 149 for removing coolant from a coolant exhaust header. It should be understood that the configurations of the various inlets 152, 154, 160 and outlets 156, 158, 162 in FIG. 2 are for the purpose of illustration, and other configurations may be chosen as desired. For example, the coolant inlet conduit 160 and the coolant outlet conduit 162 may be formed on the clamping plates 116, 118.

Adequate sealing must be provided between the discrete header sections 147, 149 and the clamping plates 116, 118. A plurality of end seals 163 is disposed at a first end and a second end of the discrete header sections 147, 149. The end seals 163 are disposed between the discrete header sections 147, 149 and one of the clamping plates 116, 118. The end seals 163 may be disposed in one of recesses (not shown) formed in the clamping plates 116, 118 corresponding to a shape of the end seals 163 and recesses formed in the first end and the second end of the discrete header sections 147, 149. Alternately, a recess (not shown) may be formed in the end seals 163 corresponding to one of the first end and the second end of the discrete header sections 147, 149, one of the first end and the second end of the discrete header sections 147, 149 disposed in the recess formed in the end seals 163.

Adequate sealing must also be provided between the discrete header sections 147, 149 and the plates 114, 120, 122. Sealing between the discrete header sections 147, 149 and the plates 114, 120, 122 militates against a mixing of the reactants and the coolant. Further, sealing between the discrete header sections 147, 149 and the plates 114, 120, 122 militates against the reactants and the coolant from leaking from the fuel cell stack 110.

Figure 3:
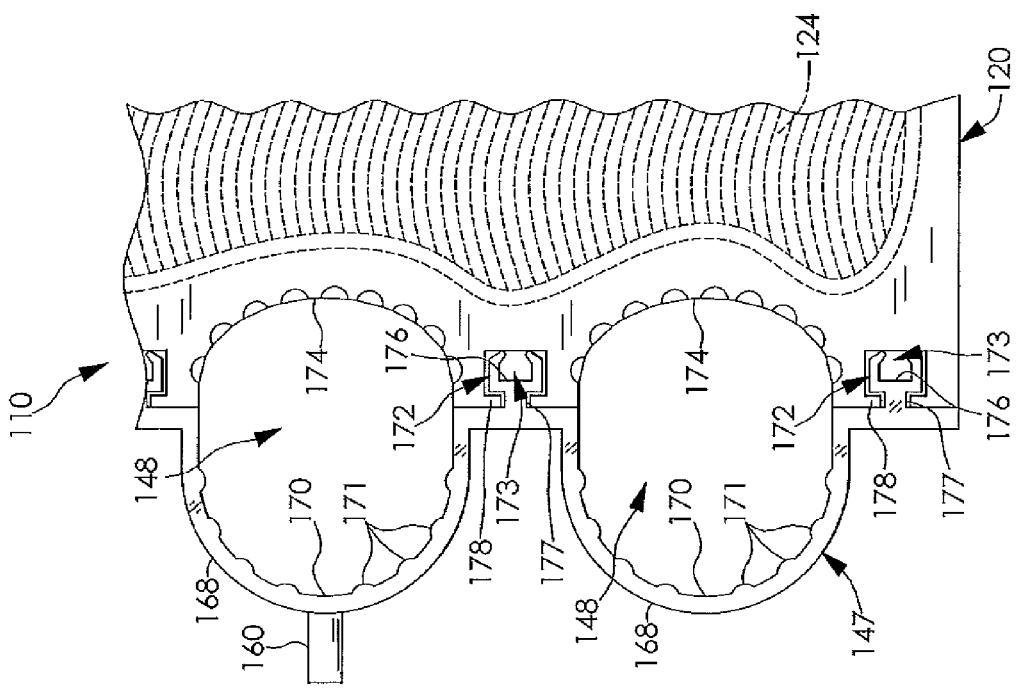
FIG. 3 is an enlarged, fragmentary top plan view of the fuel cell stack shown in FIG. 2, with a clamping plate, a first end seal, and a second end seal removed from the fuel cell stack.

FIG. 3 depicts a first embodiment of the discrete header section 147. The discrete header section 147 comprises a unitary main body 168. The discrete header section 147 includes a partial header 170 and a fastening point 172. The discrete header section 147 includes three partial headers 170 and four fastening points 172. Only two partial headers 170 and three fastening points 172 are shown in FIG. 3. The discrete header section 147 is typically formed from a nonconductive material such as a plastic and a plastic composite, for example. The discrete header section 147 may be produced by any conventional process such as a molding process and a machining process, for example.

The partial headers 170 illustrated are substantially semicircular in cross section, and extend along a length of the discrete header section 147. Other arcuate shapes, rectangular shapes, angular shapes, or any combination thereof may be used. The shape of the partial headers 170 may also vary along the length of the discrete header section 147. The partial headers 170 may be formed to increase or decrease a cross-sectional area of the supply headers and the exhaust headers over a length of the discrete header section 147. A plurality of liquid management features 171 is disposed on an inner wall of the partial header 170 to militate against liquid retention within the supply headers and the exhaust headers. The liquid management features 171 may be integrally formed with the partial header 170, formed separate from the partial header 170 and coupled thereto, or formed on the partial header 170 by a secondary operation. One of a hydrophilic coating and a hydrophobic coating may also be applied to the partial header 170 to facilitate liquid management within one of the supply headers and the exhaust headers. As shown, the discrete header section 170 includes the coolant inlet conduit 160 integrally formed therewith at an intermediate position along the length of the discrete header section 147. It should be understood that the configuration of the coolant inlet conduit 160 shown in FIG. 2 is for the purpose of illustration, and other configurations of the conduits 152, 154, 156, 158, 160, 162 formed with the discrete header sections 147, 149 may be chosen as desired.

An interface of the discrete header sections 147, 149 and the plates 114, 120, 122 is formed by a fastening point 172 formed on the discrete header sections 147, 149 and a fastening channel 173 formed in the plates 114, 120, 122. The fastening point 172 extends along a length of the discrete header and slidingly engages the fastening channel 173 to secure the discrete header section 147 to the fuel cell stack 110. A plate partial header 174 is formed adjacent the fastening channel 173. The plate partial header 174 includes one of inlets and outlets of the plates 114, 120, 122 that are in fluid communication with one of the active areas 124, 126, 128, 130 and an interior cavity of the bipolar plate 114. As shown, four fastening channels 173 are located between and on each side of the plate partial headers 174, but any configuration of the fastening channels 173 and the plate partial headers 174 may be chosen as desired.

As shown, the fastening point 172 is integrally formed with the discrete header section 147. Alternately, the fastening point 172 may be formed separate from and coupled to the discrete header section 147. The discrete header section 147 including the fastening point 172 is slidingly disposed in the fastening channel 173 of the fuel cell stack 110. As shown, the fastening point 172 is a bifurcated flanged rectangular protuberance substantially corresponding to a shape of the fastening channel 173, but any other shape may be used. A fastening keyway 176 is formed by the bifurcations in the fastening point 172, the fastening keyway 176 extending along a length of the discrete header section 147. The fastening keyway 176 is shown as being substantially rectangular in shape and having an open side to allow for expansion of the fastening point 172, but any shape may be used. The fastening point 172 includes at least one retention notch 177. As shown, the fastening point 172 includes two retention notches 177 formed therein. The retention notches 177 are rectangularly shaped and formed in opposing sides of the fastening point 172, but other shapes and arrangements of the retention notches 177 may be used.

The fastening channel 173 is formed by the alignment of a plurality of plate slots formed in the plates 114, 120, 122. The fastening channel 173 is rectangular in shape and substantially corresponds to a shape of the fastening point 172. The plate slots each include at least one retention protuberance 178. As shown, each plate slot includes retention protuberances 178 having a rectangular shape and substantially corresponding to a shape of the retention notches 177 formed in the fastening points 172, but other shapes and arrangements of the retention protuberances 178 may be used.

Figure 4:
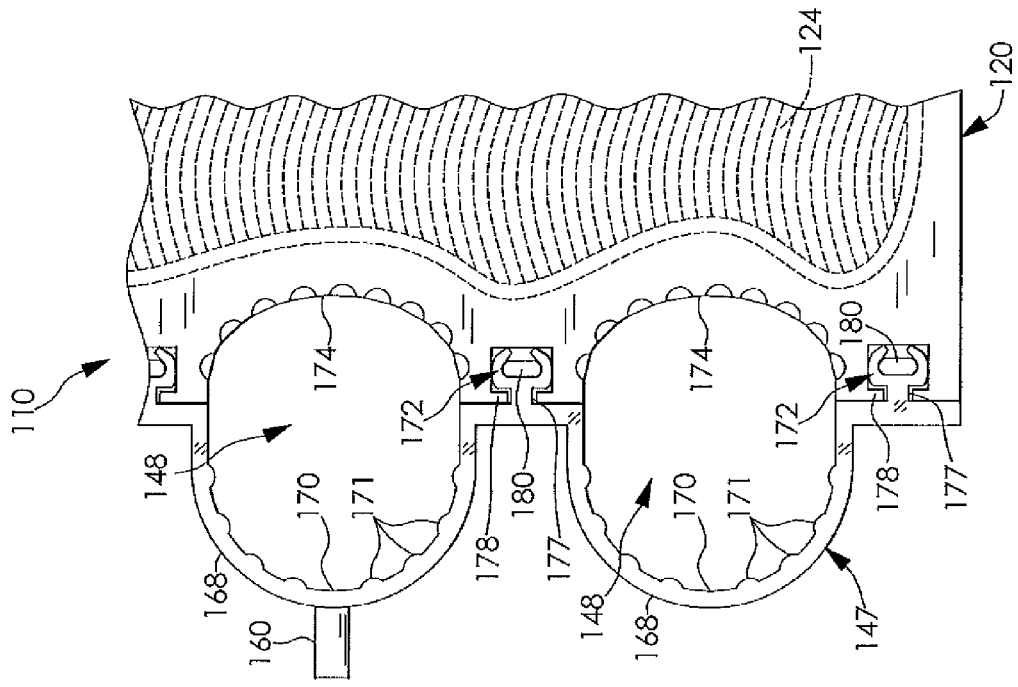
FIG. 4 is an enlarged, fragmentary top plan view of the fuel cell system shown in FIG. 2, with a clamping plate, a first end seal, and a second end seal removed from the fuel cell stack and showing a plurality of header keys inserted into a plurality of fastening points.

FIG. 4 depicts the discrete header section 147 illustrated in FIG. 3 having a header key 180 disposed in the fastening keyway 176. The fastening keyway 176 has a width smaller than a width of the header key 180. A tapered or chamfered end of the header key 180 may be formed thereon to facilitate insertion of the header key 180 into the fastening keyway 176. The insertion of the header key 180 into the fastening keyway 176 causes the width of the fastening keyway 176 to increase until the bifurcations of the fastening point 172 contact the fastening channel 173, thereby securing the discrete header section 147 to the plates 114, 120, 122. The discrete header section 147 secured to the plates 114, 120, 122 by the insertion of the header key 180 militates against a movement of the discrete header section 147 in relation to the plates 114, 120, 122 along a length of the discrete header section 147.

The header key 180 inserted into the fastening keyway 176 also creates a seal between the discrete header section 147 and the plates 114, 120, 122. MEAs 112 (not shown) disposed between the plates 114, 120, 122 are shaped to allow a portion of the MEAs 112 to enter the fastening channel 173. When the header key 180 is inserted into the fastening channel 173, the expanding fastening point 172 compresses the portion of the MEAs 112 entering the fastening channel 173, creating a seal between the discrete header section 147 and the plates 114, 120, 122.

FIGS. 5 and 6 show another embodiment of the invention similar to that shown in FIGS. 2, 3, and 4. Reference numerals for similar structure in respect of the description of FIGS. 2, 3, and 4 are repeated in FIGS. 5 and 6 with a prime (') symbol.

The discrete header section 147' shown includes the fastening points 172' having a plurality of sealing ridges 190. The fastening point 172' slidingly engages the fastening channel 173' to secure the discrete header section 147' to the fuel cell stack 110'. The fastening point 172' is integrally formed with the discrete header section 147'. Alternately, the fastening point 172' may be formed separate and coupled to the discrete header section 147'. As shown, the fastening point 172' is a flanged rectangular protuberance substantially corresponds to a shape of the fastening channel 173'. The fastening point 172' includes the sealing ridges 190. Four sealing ridges 190 are formed on each of the fastening points 172' as illustrated in FIGS. 5 and 6, but any number may be used. The sealing ridges 190 are triangular in shape and are integrally formed with the fastening point 172'. Alternately, the sealing ridges 190 may be formed separately and coupled to the fastening point 172'.

FIG. 6 depicts the fastening points 172' of the discrete header section 147' illustrated in FIG. 5 inserted into the fastening channels 173'. The fastening point 172' having the plurality of sealing ridges 190 has a width substantially corresponding to a width of the fastening channel 173'. Insertion of the discrete header section 147' creates a seal between the discrete header section 147' and the plates 114', 120', 122'. MEAs 112' disposed between the plates 114, 120', 122' are shaped to allow a portion of the MEAs 112' to enter the fastening channel 173'. As shown, when the fastening point 172' is inserted into the fastening channel 173', the sealing ridges 190' compress the portion of the MEAs 112' entering the fastening channel 173', creating a seal between the discrete header section 147' and the plates 114', 120', 122'. Alternately, the sealing ridges 190 may cut into the portion of the MEAs 112' entering the fastening channel 173', creating a seal between the discrete header section 147' and the plates 114', 120', 122'. Frictional forces between the sealing ridges 190 and the portion of the MEAs 112' entering the fastening channel militate against a movement of the discrete header section 147' in relation to the plates 114', 120', 122' along a length of the discrete header section 147'.

Figure 8:
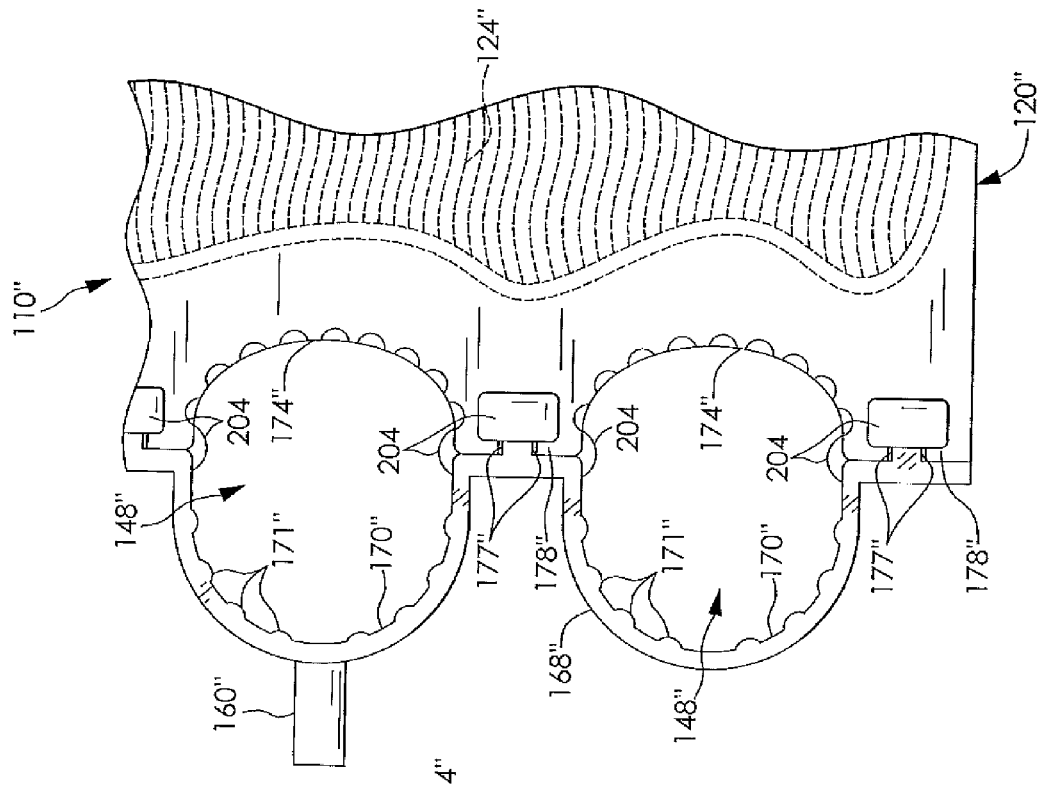
FIG. 8 is an enlarged, fragmentary top plan view of the fuel cell stack including the discrete header shown in FIG. 7, including a sealant disposed between the fuel cell stack and the discrete header.
Figure 7:
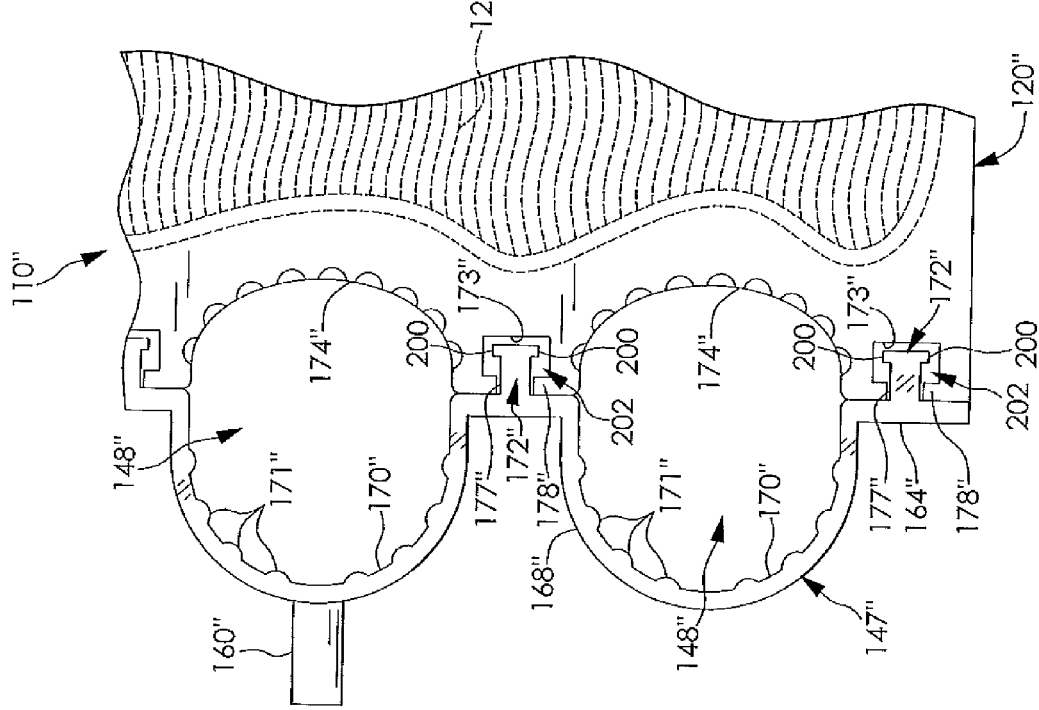
FIG. 7 is an enlarged, fragmentary top plan view of a fuel cell stack including a discrete header according to another embodiment of the present disclosure.

FIGS. 7 and 8 show another embodiment of the invention similar to that shown in FIGS. 2, 3, and 4. Reference numerals for similar structure in respect of the description of FIGS. 2, 3, and 4 are repeated in FIGS. 7 and 8 with a double prime (") symbol.

The discrete header section 147" shown in FIG. 7 includes the fastening points 172". The fastening point 172" slidingly engages the fastening channel 173" to secure the discrete header section 147" to the fuel cell stack 110". The fastening point 172" is substantially "T" shaped and is integrally formed with the discrete header section 147". Alternately, the fastening point 172" may be formed separate and coupled to the discrete header section 147". Other shapes such as a circular, a triangular, or a bifurcated shaped may be used, for example. As shown, the fastening point 172" corresponds to at least a portion of the fastening channel 173' and includes at least one fastening flange 200. As shown, two fastening flanges 200 form a portion of the fastening point 172" having a width greater than at least a portion of the fastening channel 173". A sealant cavity 202 corresponds to the portion of the fastening channel 173" not occupied by the fastening point 172".

FIG. 8 depicts the sealant cavity 202 having a sealant 204 disposed therein. The sealant 204 forms a seal between the fastening point 172" of the discrete header section 147" and the plates 114", 120", 122". Any dielectric sealant insoluble to one of the reactants and the coolant used in the fuel cell stack 110" may be used. The sealant 204 is disposed in the sealant cavity 202 through an injection process, a potting process, or other process, for example. After an appropriate curing time the sealant 204 solidifies, securing the discrete header section 147" to the plates 114", 120", 122". As shown, the sealant 204 is also applied in a bead between the partial header 170" and the plate partial header 174". The bead is applied along a length of the discrete header section 147". The sealant 204 militates against a mixing of the reactants and the coolant. Further, the sealant 204 militates against the reactants and the coolant from leaking from one of the supply and the exhaust headers through the interface of the discrete header sections 147" and the plates 114", 120", 122".

In use, the discrete header section 147, 147', 147", 149 for the fuel cell stack 110, 110', 110" minimizes the amount of material used to form the fuel cell plates 114, 120, 120', 120", 122 and a gasket portion of the MEAs 112, 112'. The material used to form the fuel cell plates 114, 120, 120', 120", 122 and a gasket portion of the MEAs 112, 112' is reduced because the fuel cell plates 114, 120, 120', 120", 122 and the MEAs 112, 112' do not encircle one of the supply and the exhaust headers for the fuel cell stack 110, 110', 110" including the discrete header section 147, 147', 147", 149. The fuel cell plates 114, 120, 120', 120", 122 used with the discrete header section 147, 147', 147", 149 require the plate partial header 174, 174', 174" and a plate slot (which collectively form the fastening channels 173, 173', 173"), minimizing an amount of inactive area on the fuel cell plates 114, 120, 120', 120", 122 and a plurality of sealing surfaces required for operation of the fuel cell stack 110, 110', 110". The plurality of sealing surfaces required for the fuel cell stack 110, 110', 110" including the discrete header section 147, 147', 147", 149 are limited to a bead seal which encloses the active areas 124, 126, 128, 130 of each fuel cell and the interfaces located between the discrete headers section 147, 147', 147", 149 and the fastening channels 173, 173', 173". As a result of minimizing the plurality of sealing surface required, reliability and cost effectiveness of the fuel cell stack 110, 110', 110" is increased.

The fuel cell stack 110, 110', 110" including the discrete header section 147, 147', 147" increases the design flexibility of a fuel cell system into which the fuel cell stack 110, 110', 110" is incorporated, Fuel cell systems having different fuel cell stack lengths may be produced to achieve a desired power requirement. The required amount of fuel and cooling needs of the fuel cell system may vary considerably depending on a length of the fuel cell stack. The fuel cell stack 110, 110', 110" including the discrete header section 147, 147', 147", 149 permits the fuel cell plates 114, 120, 120', 120", 122 and the MEAs 112, 112' to be used for fuel cell systems having different fuel cell stack lengths. As a non-limiting example, a fuel cell stack comprising of 300 fuel cells may have the supply headers and the exhaust headers about 50% larger in cross-sectional area (having the discrete header with an increased size of the partial header 170, 170', 170") than a fuel cell stack comprising of 200 fuel cells, where both the fuel cell stack comprising of 300 fuel cells and the fuel cell stack comprising of 200 fuel cells use a common fuel cell plate and a common MEA. The fuel cell stack 110, 110', 110" including the discrete header section 147, 147', 147", 149 promotes proper and sustained alignment of the fuel cell plates 114, 120, 120', 120", 122. During assembly of the fuel cell stack 110, 110', 110" an assembly fixture or a guide is used to align the fuel cell plates 114, 120, 120', 120", 122 and MEAs 112, 112' that form the fuel cell stack 110, 110', 110". The discrete header sections 147, 147', 147", 149 are then secured to the fuel cell plates 114, 120, 120', 120", 122 according to one of the embodiments of the invention illustrated in FIGS. 2-4, FIGS. 5-6, and FIGS. 7-8. The discrete header sections 147, 147', 147", 149 militate against movement of the one of the fuel cell plates 114, 120, 120', 120", 122 and the MEAs 112, 112' in relation to the discrete header sections 147, 147', 147", 149. The fastening points 172, 172', 172" of the discrete header sections 147, 147', 147", 149 maintain contact with each of the fuel cell plates 114, 120, 120', 120", 122 and the MEAs 112, 112' to stabilize the fuel cell stack 110, 110', 110". The fuel cell stack 110, 110', 110" stabilized by the discrete header sections 147, 147', 147", 149 militates against leakage of the reactants and the coolant that may occur as a result of the fuel cell stack 110, 110', 110" shifting. Further, the fuel cell stack 110, 110', 110" stabilized by the discrete header sections 147, 147', 147", 149 militates against electrical shorting that may occur as a result of the fuel cell stack 110, 110', 110" shifting.

A size of the partial headers 170, 170', 170" may vary along the length of the discrete header sections 147, 147', 147", 149 to control the cross-sectional area and the volume of the supply headers and the exhaust headers. The cross-sectional area of the supply headers and the exhaust headers that varies along the length of the discrete header sections 147, 147', 147", 149 allows a pressure differential existing along the length of the supply headers and the exhaust headers to be minimized, affording substantially equal flow rates of the reactants and the coolant into and out of the fuel cells at any point along the length of the supply headers and the exhaust headers. Further, the inlet conduits 152, 154, 160, 160', 160", the outlet conduits 156, 158, 162, or other equipment may be incorporated into the discrete header sections 147, 147', 147", 149 to simplify operation of the fuel cell system including the discrete header section 147, 147', 147", 149. As shown in FIGS. 2-8, the coolant inlet conduit 160, 160', 160" is integrally formed with the discrete header section 147, 147', 147", eliminating the need for the inlet conduit formed in the clamping plate 118. The supply inlet conduits 152, 154, 160, 160', 160" the outlet conduits 156, 158, 162, or other equipment incorporated into the discrete header section 147, 147', 147", 149 permits greater design flexibility of the fuel cell stack 110, 110', 110" and minimizes "crowding" that may occur in an end unit the supply inlet conduits 152, 154, 160, 160', 160" the outlet conduits 156, 158, 162, or other equipment is incorporated in. As a non-limiting example, the discrete header section 147, 147', 147", 149 may include an ejector integrally formed with the discrete header section 147, 147', 147", 149, where the ejector is in fluid communication with an injector disposed in the end unit of the fuel cell system.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fuel cell system, comprising:
a fuel cell plate including a first partial header and a fastening channel; and
a main body including a second partial header and a fastening point, the fastening point coupled to the fuel cell plate and passing through a slot to the fastening channel, the fastening point of the main body securing the main body to the fuel cell plate to form a first header having the first partial header in fluid communication with the second partial header, wherein a portion of the fastening point has a width greater than a width of the slot, wherein the fuel cell plate is one of a plurality of fuel cell plates, a shape of the fastening point substantially conforms to a shape of the fastening channel formed in selected ones of the plurality of the fuel cell plates, and the plurality of fuel cell plates is aligned to form a fuel cell stack; and wherein the fastening point is a bifurcated flanged protuberance having a fastening keyway formed therein, the fastening keyway substantially rectangular in shape and having an open side to allow for expansion of the fastening point.

2. The fuel cell system according to claim 1, further comprising a header key disposed in the bifurcated flanged protuberance, the bifurcated flanged protuberance expanding when the header key is inserted into the fastening keyway, the bifurcated flanged protuberance abutting one of the fastening channel and a gasket material disposed between successive fuel cell plates, securing the main body to the fuel cell stack.

3. The fuel cell system according to claim 1, wherein a retention notch between the bifurcated flanged protuberance and the main body substantially corresponds to is created by a retention protuberance formed in the fuel cell plate.

4. A fuel cell system comprising:
a plurality of fuel cell plates aligned to form a fuel cell stack, the fuel cell stack including a first partial header and a channel formed by the plurality of fuel cell plates;
a plurality of membrane electrode assemblies at least partially formed from a gasket material, each of the membrane electrode assemblies disposed between adjacent fuel cell plates;
a discrete header section including a second partial header; and
a fastening point disposed on the discrete header section, the fastening point extending along a length of the discrete header section, the fastening point being a flanged protuberance substantially conforming to a shape of the channel passing through a slot to the channel, wherein the flanged protuberance is bifurcated, forming a fastening keyway therein, and wherein the fastening point is coupled to the channel to form a first header having the first partial header in fluid communication with the second partial header and a portion of the fastening point has a width greater than a width of the slot.

5. The fuel cell system according to claim 4, wherein a retention notch created between the fastening point and the discrete header section substantially corresponds to a retention protuberance formed in the fuel cell plates.

6. A fuel cell system comprising:
a plurality of fuel cell plates aligned to form a fuel cell stack, the fuel cell stack including a first partial header and a channel formed by the plurality of fuel cell plates;
a plurality of membrane electrode assemblies at least partially formed from a gasket material, each of the membrane electrode assemblies disposed between adjacent fuel cell plates;
a discrete header section including a second partial header and one of a fluid inlet and a fluid outlet formed in the second partial header at an intermediate position along a length of the discrete header section;
a fastening point disposed on the discrete header section, the fastening point extending along the length of the discrete header section, the fastening point being a flanged protuberance substantially conforming to a shape of the channel; and
a fastening keyway formed in the fastening point, the fastening keyway extending along the length of the discrete header section for receiving a header key, wherein the fastening point expands when the header key is inserted into the fastening keyway, the fastening point abutting one of the channel and the plurality of membrane electrode assemblies disposed between the plurality of fuel cell plates, securing the discrete header section to the fuel cell stack to form a first header having the first partial header in fluid communication with the second partial header.

\* \* \* \* \*